(12) United States Patent
Seeliger et al.

(10) Patent No.: US 7,871,270 B2
(45) Date of Patent: Jan. 18, 2011

(54) DEPLOYABLE TRAINING DEVICE VISUAL SYSTEM

(75) Inventors: Jason L. Seeliger, Akron, OH (US); Randall W. Wallace, Uniontown, OH (US); Edward W. Quinn, Uniontown, OH (US); Michael R. Vogel, Stow, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 818 days.

(21) Appl. No.: 11/358,484

(22) Filed: Feb. 20, 2006

(65) Prior Publication Data
US 2007/0196793 A1 Aug. 23, 2007

(51) Int. Cl.
*G09B 9/08* (2006.01)
(52) U.S. Cl. .......................... 434/38; 434/44
(58) Field of Classification Search ............. 434/29–69; 345/419, 619, 7–9, 475, 427; 348/E13.015, 348/46, 51, E13.074, E13.075; 235/411; 427/75–76, 81–84, 57; 353/30, 94, 99
See application file for complete search history.

(56) References Cited

U.S. PATENT DOCUMENTS 4,028,725 A * 6/1977 Lewis .......................... 348/115
6,956,576 B1 * 10/2005 Deering et al. .............. 345/475

* cited by examiner

*Primary Examiner*—Xuan M Thai
*Assistant Examiner*—Timothy Musselman
(74) *Attorney, Agent, or Firm*—Renner Kenner Greive Bobak Taylor & Weber

(57) ABSTRACT

A simulator is disclosed which includes an image generator that includes a forward display system and a peripheral display system to provide a field of view. The forward display system utilizes a forward projection system to provide forward imagery with high-resolution. The peripheral display system utilizes a helmet-mounted display system to provide peripheral imagery. The forward and peripheral imagery are merged by the image-generator so as to provide a full field of view with as much high-resolution imagery as possible.

14 Claims, 8 Drawing Sheets

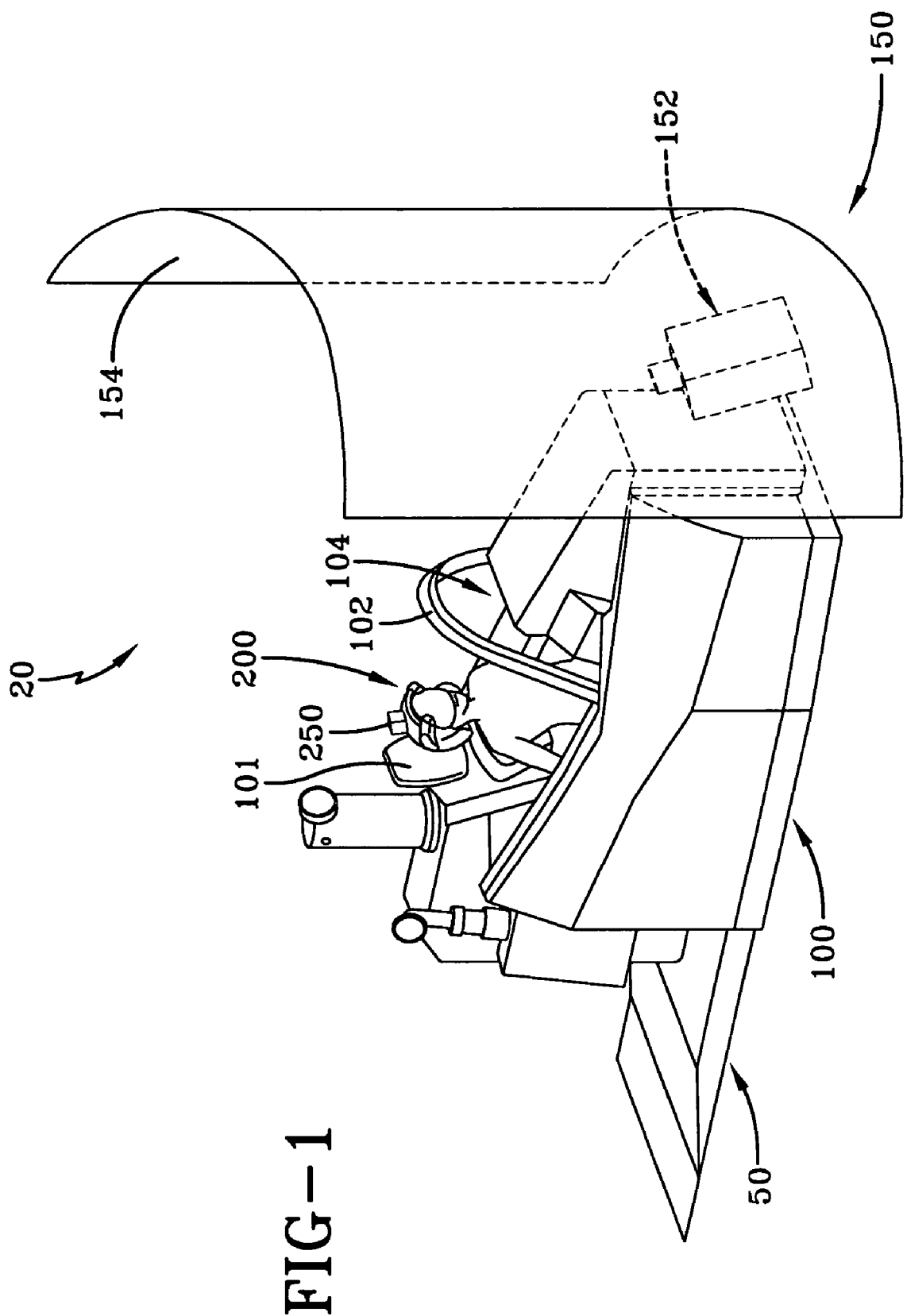

DEPLOYABLE TRAINING DEVICE VISUAL SYSTEM

TECHNICAL FIELD

The present invention relates generally to simulators. More particularly, the present invention relates to simulators that provide a high resolution display. Specifically, the present invention relates to simulators that provide a high resolution display with a large field of regard.

BACKGROUND OF THE INVENTION

To obtain a realistic simulation, many flight simulators, particularly those for fighter and attack aircraft, use visual systems. These visual systems typically combine an image generation system (e.g., a computer image generator) with an image display system (e.g., cathode ray tubes or an optical projector and screen).

For maximum training capability, an ideal visual system should allow a trainee to: (1) see a wide field of view (FOV), and (2) see at least a portion of this field of view in high-resolution. Such a system would allow a trainee to search for minimally sized, but realistic targets and other objects within the field of view, and to discriminate one object from another. In effect, this ideal visual system would provide a high acuity scene throughout the entire field of view.

While today's technology might allow a system to provide a high detail scene throughout the trainee's entire field of view, such a solution would require huge capital expenditures and a large footprint for the equipment. Customers are not willing to pay the excessive cost nor are they willing to tolerate the large footprint associated with such a system. Large footprints are undesirable inasmuch as simulators often need to be located in limited-size areas such as aircraft carriers, forward-deployed areas, and the like. Thus, a visual system that has these capabilities has been economically and logistically unfeasible to date.

One system that attempted to solve this challenge relied solely on projector technology. This system included a screen that was positioned in the trainee's forward field of view and a high-resolution projector. Because the trainee's field of view was limited to the screen in his or her forward field of view, customers found this system to be inadequate. In short, the trainee lacked peripheral vision and the ability to look over his or her wing. Thus, the system was less than ideal for simulating flying in formation, takeoffs, landings, and a number of other scenarios.

Another attempt to deliver a high-resolution display entailed a complete helmet mounted display solution. In essence, this system did away with the projector and screen altogether. Under this solution, the helmet mounted display provided the trainee with the entire simulation. However, trainees encountered two problems with this solution, namely, tunnel vision and the absence of a high-resolution display. Because the helmet mounted display had a limited field of view that is not comparable to the human eye FOV, the visual scene didn't provide the trainee with enough visual information. Today's technology does not provide a solution to the resolution problem in the helmet mounted display arena.

Therefore, the present invention serves to provide trainees with a realistic training experience, by providing a high resolution display while at the same time providing a small footprint and relatively low computing requirements.

SUMMARY OF THE INVENTION

In light of the foregoing, it is a first aspect of the present invention to provide a deployable training device visual system.

It is another aspect of the present invention to provide a method of providing a simulation comprising providing a field of view, generating forward imagery information via a forward display system, and generating peripheral imagery information via a peripheral display system to the extent that the field of view extends beyond the forward display system.

It is another aspect of the present invention to provide a method of providing a simulation comprising identifying a field of view within a field of regard, rendering a plurality of channels that are at least substantially representative of the field of view, displaying forward imagery information on a forward display, wherein the forward imagery information relates to one of the plurality of channels, and displaying peripheral imagery information on a peripheral display only to the extent that the field of view extends beyond the forward display, wherein the peripheral imagery information relates to at least a second of the plurality of channels.

It is another aspect of the present invention to provide a simulator comprising an image generator which generates imagery information, a first display for displaying first imagery information, and a second display for displaying second imagery information wherein the first display and the second display are physically separate.

BRIEF DESCRIPTION OF THE DRAWINGS

For a complete understanding of the objects, techniques and structure of the invention, reference should be made to the following detailed description and accompanying drawings, wherein:

FIG. 1 is a perspective drawing of a partially broken-away simulator made according to the concepts of the present invention;

BEST MODE FOR CARRYING OUT THE INVENTION

Figure 3:
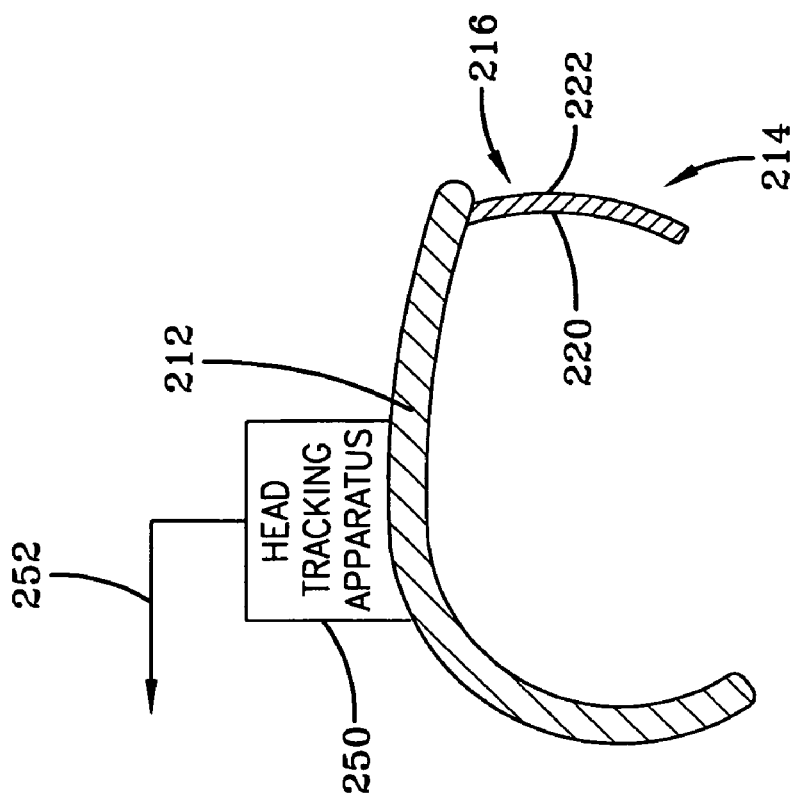
FIG. 3 is a cross-sectional view of a helmet shell and visor of the head-mounted assembly.

The present concept is best understood by referring to the drawings. Although the drawings are generally tailored towards a flight simulator, aspects of the present concept are equally applicable to land-vehicle simulators, water-vehicle simulators, or other various simulation environments.

As shown in FIG. 1, a simulator of the present concept is generally designated by numeral 20. A simulator 20 may include: a floor platform 50, a mock instrumentation apparatus 100, a forward display system 150, a peripheral display system 200, and a head tracking apparatus 250.

The floor platform 50 may be attached to and/or adjacent to the forward display system 150. In various embodiments, the floor platform will be a floor or other support structure of a building or other structure. In other embodiments, the floor platform may exist independent of the building or other structure.

As will be appreciated by those skilled in the art, hydraulics and/or other motorized mechanical parts may be attached to the underside of the floor platform 50. These hydraulics or other mechanical parts cause the floor platform to pitch, roll, incline, decline, rotate, vibrate, or otherwise move about with respect to the display system 150. By communicating with the mock instrumentation apparatus 100 and/or other devices in the simulator, these mechanical parts offer a more realistic simulation experience. In the alternative, the hydraulic and motorized components may be included in the mock instrumentation apparatus 100.

Other various embodiments will not include these hydraulics or mechanical parts. In these other embodiments, the underside of the floor platform may rest directly on a floor of a building or other structure. Embodiments that do not include the additional mechanical parts may be particularly desirable for customers who desire an affordable simulator that may fit into a relatively small space. In particular, when the floor platform rests directly on the floor of a building or other structure and the forward display system provides a curved projection or viewing surface, customers may receive a particularly compact simulator.

The simulator 20 includes a mock instrumentation apparatus 100, which may also be referred to as a cockpit. The mock instrumentation apparatus 100 is supported by the floor platform 50. Accordingly, any movement of the platform 50 is imparted to the apparatus 100. A goal of the mock instrumentation apparatus 100 is to provide a user or trainee with realistic simulation controls and a realistic simulation environment.

The mock instrumentation apparatus 100 may include a seat 101, a skeletal canopy 102 surrounding the seat and an instrumentation panel 104 contained within or in close proximity to the canopy. The seat 101 and the canopy 102 are structured to match the environment of an aircraft cockpit. Of course, different types of simulators will have appropriate structural surroundings. The instrumentation panel 104 may generally attempt to emulate the various inputs and output available to a pilot of a particular aircraft. The instrumentation panel 104 may include lights, dials, gauges, LCD or CRT screens, speakers, optical devices, vibration devices, hydraulic devices, or any other type of output device commonly found in aircraft or vehicle instrument panels; as well as joysticks, brakes, flight control apparatus, weapons systems, levers, buttons, keyboards, actuators, switches, microphones, or any other type of input device known in this or other arts. The instrumentation panel 104 may display at least one of: position (e.g., altitude, latitude, and longitude), speed, fuel remaining, air-targets, land-targets, radar, mission log, or any other type of information that is useful to a trainee.

In various embodiments, the mock instrumentation apparatus 100 provides information to an image generator 300 (discussed below, see FIGS. 5-6), and the image generator 300 updates the imagery information displayed by the forward display system 150 and the peripheral display system 200. In various embodiments, the imagery information may include data that represents all or portions of the mock instrumentation apparatus 100, skeletal canopy 102, or instrumentation panel 104, and the same may be displayed on the forward display system 150 and/or peripheral display system 200.

The forward display system 150 may be any system that is suitable for providing forward imagery information. The forward imagery information is a high-resolution image wherein the forward display system is the primary visual display system. The term "high-resolution" may include resolutions of about 1280×1024 pixels to about 4800×2400 pixels, and in a particular embodiment is a resolution of about 4096×2160. By utilizing a "high resolution" display, the present concept provides a trainee with a more realistic simulation experience because the trainee will be able to discern more detail than low-resolution displays.

The forward display system 150 includes (i) one or more projectors 152 for projecting forward imagery information, and (ii) one or more projection surfaces 154 for displaying the forward imagery information. Typical projectors 152 may have an effective resolution that ranges from about 0.01 arc-minutes/optical line pair to about 6 arc-minutes/optical line pair (OLP). In a particular embodiment, projector 152 has a resolution of approximately 2 arc-minutes/optical line pair, which corresponds to a generally accepted resolution for the foveal portion of the human eye. In embodiments utilizing one or more projectors 152, the forward display system 150 will include one or more projection surfaces 154 for displaying the forward imagery information. The shape of the surface may include, but is not limited to: a planar surface; a cylindrical surface; a spherical surface; a non-spherical, but generally continuous surface; or a faceted surface that is made up of either flat and/or curved surfaces. Such projection surfaces may comprise any suitable material including, but not limited to: fiberglass, aluminum, foam, drywall, vinyl, paper, plastic, or any other naturally occurring or synthetic substance. Such projection surfaces may include one or more layers, wherein the surface optimally displays images depending upon the type of projector used.

Instead of using a projected image, it will be appreciated that the forward display system 150 may include a direct display device such as cathode ray tubes, liquid crystal displays, liquid crystal on silicon displays, plasma displays, or any other such technology for providing the forward imagery information with the aforementioned high-resolution characteristics. In these various embodiments, the forward display system may typically include one or more adjoining facets, each facet comprising a viewing surface. These adjoining facets will each display one segment of an image, such that the facets collectively display the entire forward image.

In specific embodiments, the forward display system 150 may be referred to as an out-the-window (OTW) display system. Regardless of the mode of display—forward projection or direct display—the displayed image is associated with mock instrumentation apparatus 100 so as to provide a trainee with a high-resolution forward field of view. In these embodiments, the forward information will typically be a high-resolution image that allows a trainee to discern greater detail and provide an appropriate perspective between the instruments and the images portrayed outside of the cockpit. Although high-resolution is desired throughout the entire simulation, it will be appreciated that the high resolution imagery is particularly advantageous in the forward field of view.

The dimensions of a typical forward display may be defined in various ways. For example, a typical forward display may have a height of about 1 foot to about 10 feet; and a width of about 2 feet to about 20 feet. In a very particular embodiment, the forward display has a height of about 4 feet and a width of about 8 feet. A typical forward display may also be defined in terms of forward field of view. For example, common forward displays may have a forward field of view ranging from about 40° Height (H) to about 90° H, and from 50° Vertical (V) to about 120° V. In a very particular embodiment the forward field of view is about 50° H and about 108° V. Such dimensions may provide a convenient projection surface for displaying a high resolution image. For example, a forward field of view of 45° H×34° V would require only one 1600×1200 pixel projector to get better than 4 arc-min/OLP of resolution. Such resolution would be only half as good as human eye resolution but is believed to be a factor of two better than typical current flight simulation technology.

To enhance the simulation, the simulator 20 may include a peripheral display system 200. In general, the peripheral display system 200 supplements the forward display system and provides peripheral imagery information to the extent that a field of view extends beyond the forward display system 150.

Figure 2:
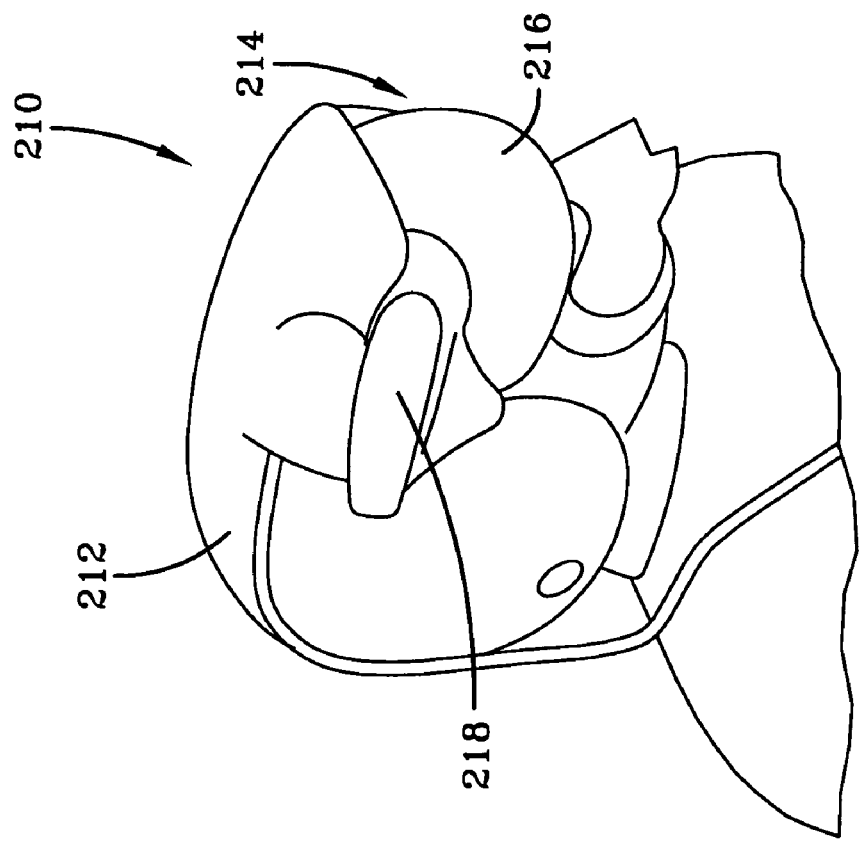
FIG. 2 is a perspective view of a trainee wearing a head-mounted assembly utilized with the simulator.

As best seen in FIGS. 2 and 3, the peripheral display system 200 is embodied in a head-mounted assembly 210. The head-mounted assembly 210 includes a helmet shell 212 which carries a supplemental display 214. A visor 216 is associated with the shell 212 and may be movable into different positions with respect thereto. The display 214 also includes one or more graphics generators 218 that are also carried by the shell 212 and configured to project an image on to the supplemental display 214, which is ideally incorporated with the visor 216. The helmet shell 212 generally surrounds a trainee's head. The shell 212 may be made of any substance, but is generally composed of a rigid material. In typical embodiments, the helmet shell 212 and supplemental display 214 will be integrated and not movable with respect to each other. In general, the supplemental display 214 may provide a trainee with two types of scene information: peripheral imagery information, and heads-up display information. The visor 216 is configured to allow the trainee to see at least a portion of the forward display system 150. As shown in FIG. 3, the visor 216 includes an inner surface 220 and outer surface 222, between which a thickness is defined. In addition to allowing the trainee to see at least a portion of projection surfaces 154, the visor 216 provides at least one display surface 224 for displaying the information generated by the graphics generator 218. In various embodiments, the visor 216 may comprise two or more display surfaces 224, for example, one corresponding to a right eye and another corresponding to a left eye. As will be described in further detail, peripheral images are projected or otherwise displayed on the respective left and right sides of the visor while allowing a centrally disposed section of the visor to remain visually transparent to allow the trainee to view the forward imagery and the instrumentation panel 104. In any event, one or more graphics generator(s) 218 may provide the trainee with the peripheral imagery information and heads-up display information. In some instances, the heads-up information may be projected or otherwise displayed in the centrally disposed section and is viewed in conjunction with the forward imagery information. Graphics generator 218 generates the peripheral imagery information and heads-up display information and causes the information to be presented on at least one display surface 224. In some embodiments, the display surface 224 may be the outer surface 222 of the visor 216. One such embodiment includes a graphics generator 218 that is located on the outside of the helmet shell 212 and that projects imagery information onto an outer surface 222 of the visor 216. In other embodiments, the display surface 224 may be the inner surface 220 of the visor 216. An example of this embodiment includes a graphics generator 218 that is located on the inside of the helmet shell 212 and that projects imagery information onto the inner surface 220 of the visor 216. In still other embodiments, a display surface 224 is found between an outer surface 222 and inner surface 220 of the visor 216. An example of this embodiment might include a graphics generator 218 made up of LCDs that are located in the visor 216 itself.

In various embodiments, graphics generator 218 may include a stereoscopic display. Such displays often include two projectors—one corresponding to each of the trainee's eyes. A common technique used in such displays is to polarize light in one direction for the right eye and to polarize light in another director for the left eye. Filters may be associated with the projectors and/or the display surfaces aid the trainee in viewing the images.

Figure 4:
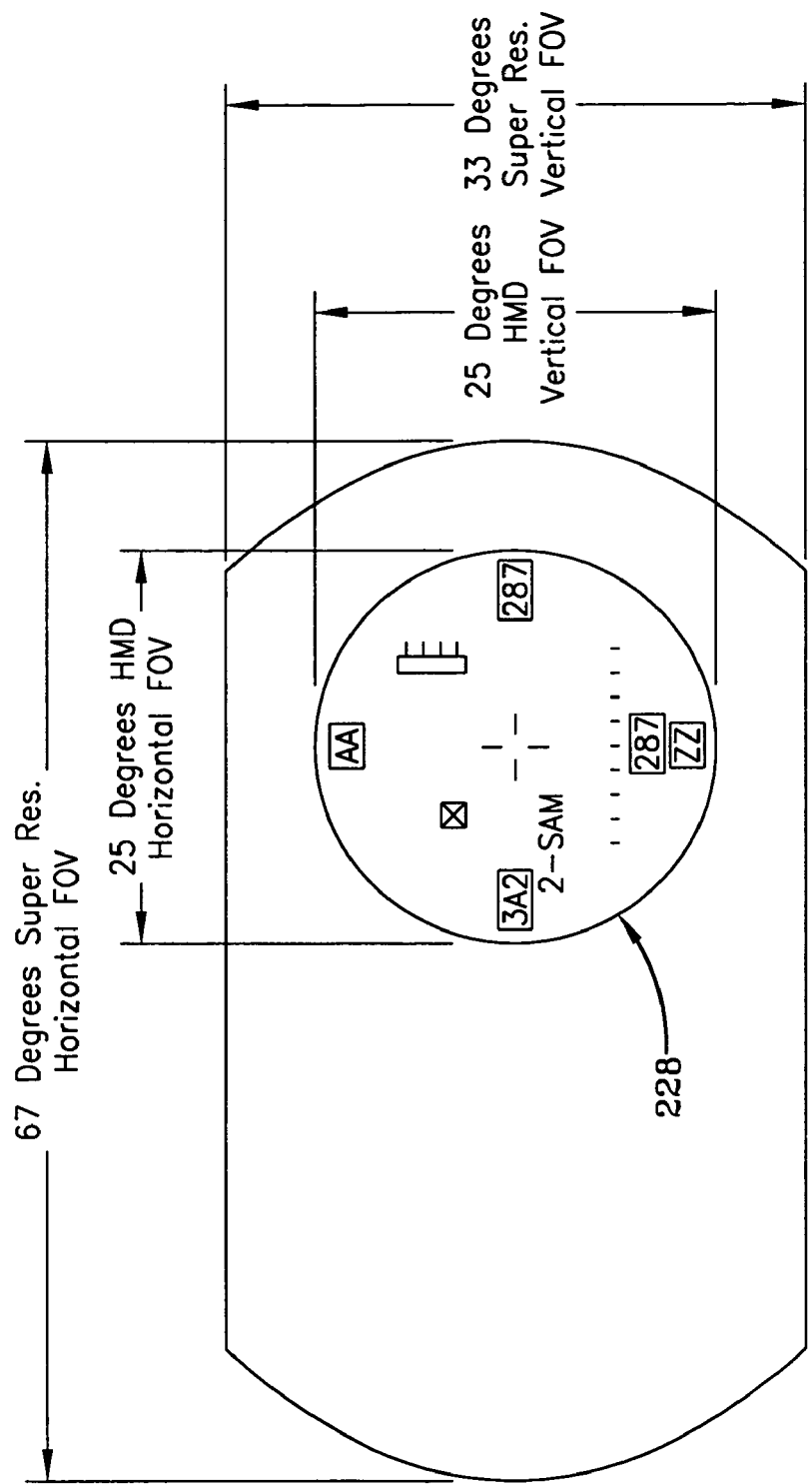
FIG. 4 illustrates an exemplary field of view for a trainee.

FIG. 4 illustrates sample heads-up display information 228 that a trainee may see. While FIG. 4 suggests angular coverage limits that a trainee may see, these angular coverage limits are merely illustrative and do not limit the scope of the present concept. For example, although FIG. 4 illustrates that in a particular embodiment the visor may provide a trainee with an angular coverage limit of 67 degrees horizontally and 33 degrees vertically, various visors in other embodiments may include any horizontal angular coverage as well as any vertical angular coverage.

Referring back to FIGS. 1-3, it can be seen that a head tracking apparatus 250 is associated with the helmet shell 212. The head tracking apparatus 250 monitors the position of the trainee's head for the purpose of generally determining where the trainee's line of sight is with respect to the mock instrumentation apparatus 100 and specifically the skeletal canopy 102 and the instrumentation panel 104. The tracking apparatus may be in the form of sensors that are attached directly to the helmet shell and detect head movement. Alternatively, observable indicia may be disposed on the helmet shell and fixed sensors monitor the indicia to determine head movement. In any event, the apparatus 250 generates head tracking information 252. The head tracking information 252 is directly or indirectly related to at least one of: a head position, a head orientation, an eye position, an eye orientation, or a line of sight. The terms "position" and/or "orientation" may include information relating to: pitch, roll, and/or yaw of the trainee's head; and/or movement of the trainee's head in the x, y, and/or z directions.

One head tracking detection apparatus may detect a trainee's head position and/or orientation and may include, for example, a series of accelerometer(s), microprocessor(s), memory module(s), software, and other components that output data that is representative of the trainee's head position and orientation.

Other head tracking apparatus 250 may detect a trainee's eye position and/or orientation and/or the trainee's instantaneous line-of-sight using eye-tracking techniques. These techniques may generally use light or other electromagnetic radiation to determine where the trainee is looking. This embodiment may include for example, optical detector(s), microprocessor(s), memory, software, and other components that are capable of determining where the trainee is looking.

The head tracking apparatus 250 may be an off-the-shelf system, in which case the head tracking information 252 is likely transmitted from the head tracking apparatus 250 via a bus or a wireless signal. In other embodiments, the head tracking apparatus 250 may be more closely integrated into the simulator, in which case the head tracking information 252 may be utilized by high-level software routines (e.g., the head tracking information 252 may be stored in various memory arrays, then utilized by a host-processor or other digital processing engine in combination with various memory units and hardware peripherals). Alternatively, the head tracking apparatus may be a low-latency head tracking apparatus.

In addition to monitoring the trainee's head position, the simulator 20 may use the head tracking information 252 in various ways. For example, the mock instrumentation apparatus 100 may utilize the head tracking information 252 to determine the cockpit lighting intensity and/or lighting intensity of the instrumentation panel 104. For example, the cockpit lighting and/or instrumentation panel 104 may be "turned up" when the trainee looks into the cockpit. Alternatively, the cockpit lighting and/or instrumentation panel 104 may be "turned down" when the trainee looks out of the cockpit. Thus, the head tracking information 252 may aid in providing a trainee with a more realistic simulation experience that includes cockpit activities such as map reading in daylight scenes.

Figure 5:
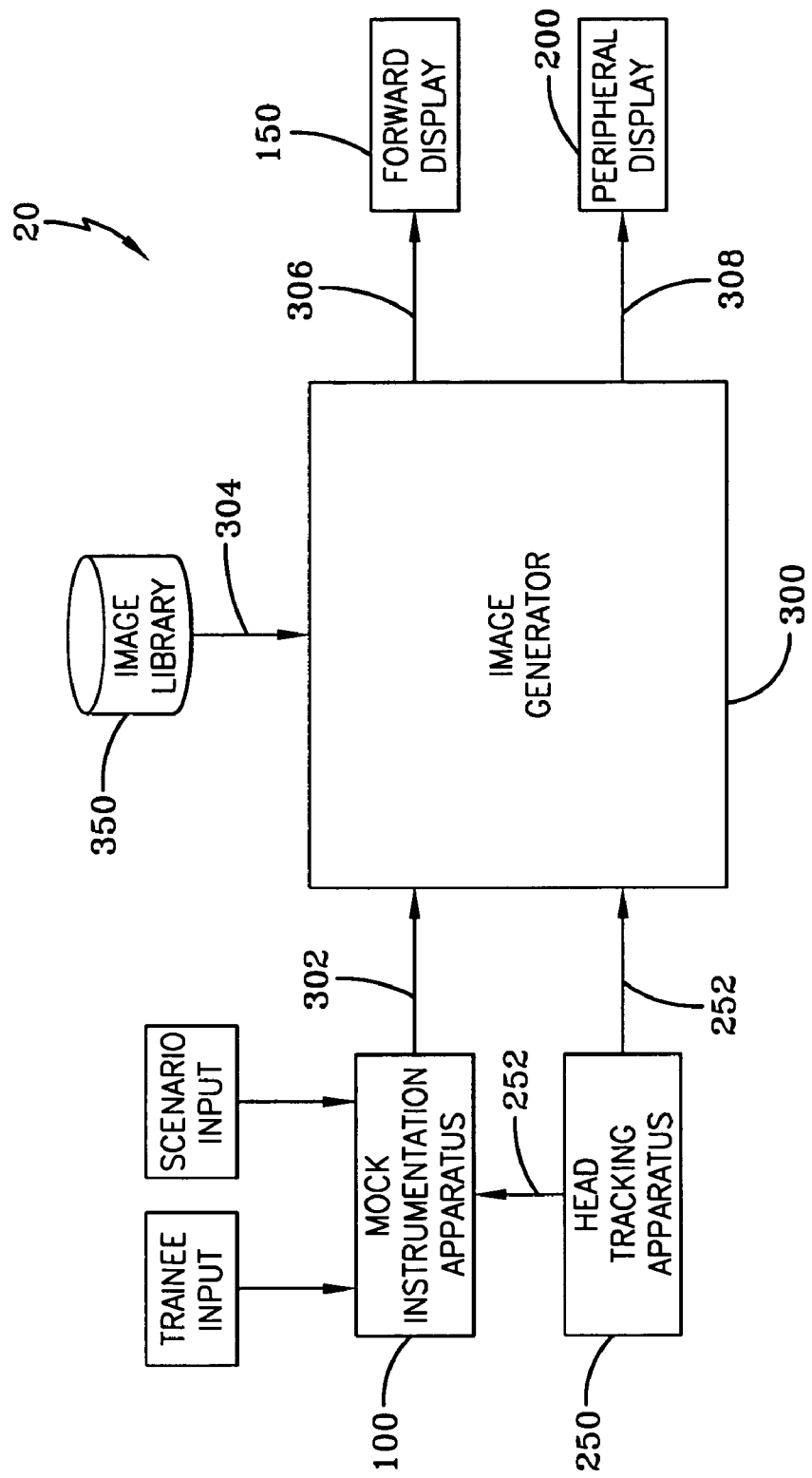
FIG. 5 is a block diagram showing a head tracking apparatus and various modules that utilize head tracking information.
Figure 6:
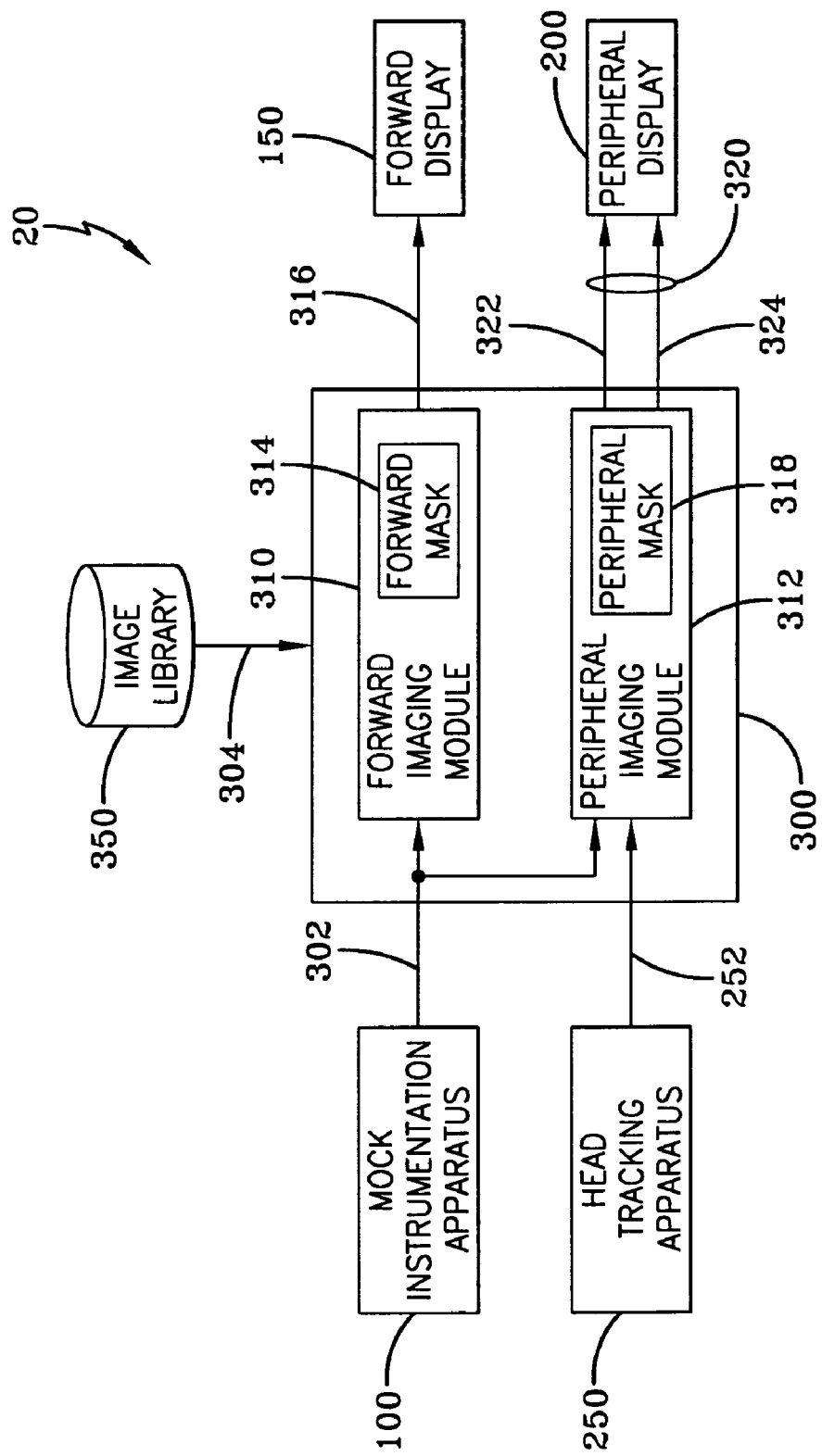
FIG. 6 is a block diagram showing an alternate image generator.

Referring now to FIGS. 5 and 6, it can be seen that the components of the system 20 previously described—the mock instrumentation apparatus 100, the forward display 150, the peripheral display 200, and the head tracking apparatus 250—are also associated with an image generator 300 and an image library 350. In general, the image generator 300 may receive data from several sources, including but not limited to: instrumentation data 302 from the mock instrumentation apparatus 100, head tracking information 252 from the head tracking apparatus 250, and image information 304 from an image library 350. The image generator 300 may utilize the head tracking information 252 to aid in blending the forward imagery information with the peripheral imagery information to the extent that a field of view extends beyond the forward display system 150. To accomplish this, the image generator 300 may render a plurality of channels that are at least substantially representative of imagery information in a field of view. In a particular embodiment, the image generator 300 controls one or more primary channels 306 relating to the forward display system 150, and also controls one or more supplemental channels 308 relating to the peripheral display system 200. Typically, the primary channels 306 and supplemental channels 308 are gen-locked. In other words, the image generator 300 sequences the generation of images for the channels 306 and 308 so that they are generated and appear to the trainee at the same moment in time. If the channels are not gen-locked, it is likely that the forward imagery information and the peripheral imagery information would appear disjointed when viewed by a trainee.

The image library 350 is a software library or database and likely includes geometries, textures, and shapes that are based on polygons. Based on how a trainee manipulates or provides input to the mock instrumentation apparatus 100, the image generator 300 considers information from the image library 350 and outputs imagery data to the primary channels 306 and supplemental channels 308 that is at least substantially representative of the trainee's actions in the simulated environment. For example, if a trainee pulls back on a throttle in the mock instrumentation apparatus 100, the image generator 300 renders corresponding primary and supplementary channels, which may result in the forward display system 150 and peripheral display system 200 displaying forward imagery information and peripheral imagery information, respectively, that shows the trainee climbing in altitude. Often the forward imagery information will be provided on the forward display, and the peripheral imagery information will be provided on at least a portion of the peripheral display to the extent that a field of view extends beyond the forward display. In addition to trainee input, it will be appreciated that scenario input may also be provided to the system 20. The scenario input may include scenes or system inputs that enhance the training experience. For example, scenario input may include weather conditions, simulated breakdowns of the aircraft or other system related to the simulation environment, enemy activities and the like.

As shown in FIG. 6, various embodiments of the image generator 300 may include several sub-modules including: a forward imaging module 310, a peripheral imaging module 312, a forward mask 314, and peripheral mask 318. The forward imaging module 310 typically considers information from at least one of several sources, including but not limited to: image data 304 from the image library 350, and instrumentation data 302 from the mock instrumentation apparatus 100. The forward imaging module 310 may also include a forward mask 314 for providing forward imagery information that blends with the peripheral imagery information provided by the peripheral imagery module. The forward imaging module 310 typically controls one or more primary channels 316, the primary channels affecting the forward imagery information displayed on the forward display.

In a typical embodiment where the forward display system 150 is a forward field of view or an out-the-window display, the forward imaging module 310 provides forward imagery information that is representative of a pilot's view out of the front of the cockpit. In effect, in these typical embodiments, based on the image data 304 from the image library 350 and the trainee's manipulation of the mock instrumentation apparatus, the forward field of view could always be displayed. Although the forward field of view may be displayed substantially independent of the head tracking information 252, the forward imaging module 310 considers the head tracking information for a variety of uses, for example: blending the forward imagery information with the peripheral imagery information, displaying the trainee's view of the instrumentation panel (likely if the forward display is displaying a portion of the instrumentation panel), or a host of other such considerations.

The peripheral imaging module 312 typically considers information from at least one of several sources, including but not limited to: image data 304 from the image library 350, instrumentation data 302 from the mock instrumentation apparatus 100, and head tracking information 252 from the head tracking apparatus 250. The peripheral imaging module 312 may also include a peripheral mask 318 for providing peripheral imagery information that blends with the forward imagery information provided by the forward imaging module. The peripheral imaging module 312 controls one or more supplemental channels 320, the supplemental channels effecting the peripheral imagery information displayed on the peripheral display 200.

In a typical embodiment where the peripheral display system 150 is embodied in a head-mounted assembly 210, the peripheral imaging module 312 provides peripheral imagery information only to the extent that a field of view extends beyond the forward projection surface 154. In effect in these typical embodiments, based on the image data 304 from the image library 350, the trainee's manipulation of the mock instrumentation apparatus, and the head tracking information 252; the peripheral imagery information would only be provided on a portion of the visor 216 to the extent that a field of view extends beyond the forward projection surface 154. In such embodiments, the forward field of view is supplemented by the peripheral imagery information, but only to the extent the field of view extends beyond the forward projection surface 154. In such embodiments, the head-mounted assembly 210 and its extended functionality may be an "add-on" to the simulator 20, because the simulator may still function sufficiently well without it.

As shown in FIG. 6, various embodiments of the image generator 300 may include a peripheral imaging module 312 that has two channels: a left component channel 322 and a right component channel 324. In a particular embodiment where the peripheral display is embodied in a head-mounted display 210, the functionality of the left component channel 322 and the right component channel 324 may be easily understood. In such an embodiment, the left component channel 322 may provide imagery information via the graphics generator 218 and display surface 224 to a trainee's left eye to the extent that the trainee looks beyond the forward display surface 154. For example, if a trainee looks over his left shoulder (e.g., over the left wing), he is likely to look beyond the imagery provided by the forward display system 150. In such an event, the left component channel 322 will provide the trainee's left eye with additional imagery information that is representative of what the left eye would see in the simulated environment. Similarly, the right component channel 324 may transmit imagery information via the graphics generator 218 and display surface 224 to a trainee's right eye to the extent that the trainee looks beyond the imagery provided by the forward display system 150. For example, if a trainee looks over his right shoulder (e.g., over the right wing), he is likely to look beyond or to the side of the forward projection surface. In such an event, the right component channel 324 will provide the trainee's right eye with imagery information that is representative of what the right eye would see in the simulated environment.

Figure 7:
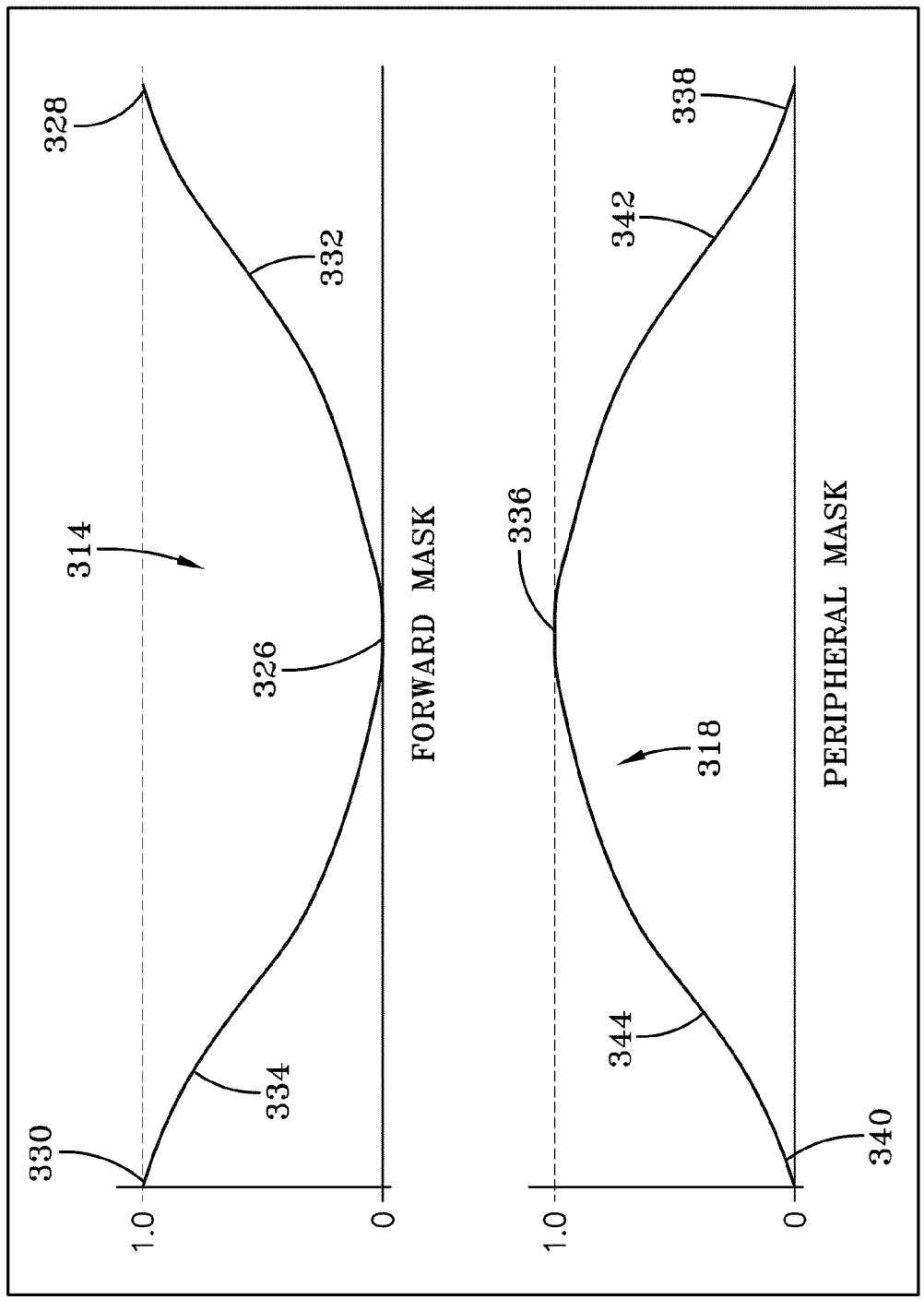
FIG. 7 is a plot showing characteristics of a forward mask and a peripheral mask.

The forward mask 314 and peripheral mask 318 may exist in several embodiments and may be best understood with reference to FIG. 7. Generally, the forward mask 314 (which may also be referred to as a transparency mask) and the peripheral mask 318 (which may also be referred to as an inverse mask) blend, or allows the system 20 to merge, the forward imagery information of the forward display system 150 with the peripheral imagery information on the peripheral display system 200. This "blending" of the imagery information is designed such that the optical modulation transfer function (MTF) response of the human visual system is minimal. In other words, the forward and peripheral scene information is blended or mixed in such a way that the trainee is unable to noticeably detect a change in the type or quality of scene information being displayed.

FIG. 7 shows a particular embodiment, in which the forward transparency mask 314 and the peripheral inverse mask 318 work in tandem to display a final image with normalized light intensity. The transparency mask 314 has a central region 326 and edge regions 328, 330. The transparency mask 314 provides a light intensity of approximately zero in the central region 326; a light intensity of about one at the edge regions 328, 330; and is generally piece-wise continuous therebetween. This piece-wise function may approximate a continuous function, or may in fact be continuous. The light intensity provided by the transparency mask 314 has two inflection points 332, 334 that exist between the central region 326 and the edge regions 328, 330.

Still referring to FIG. 7, the inverse mask 318 also has a central region 336, and edge regions 338, 340. This inverse mask 318 provides for a light intensity of approximately one in the central region 336; approximately 0 at the edge regions 338, 340; and is generally piece-wise continuous therebetween. This piece-wise function may approximate a continuous function or may in fact be continuous. The light intensity provided by the inverse mask 318 has two inflection points 342, 344 that exist between the central region 336 and the edge regions 338, 340.

The inflection points 332, 334, 342, 344 aid in "blending" the forward imagery information and the peripheral imagery information. The blending may occur in a region of the forward imagery information and the peripheral imagery information over any distance, and in a particular embodiment the blending may occur in a region of about 5°. Because the images blend, the trainee is less likely to notice any lines or visual artifacts between the forward imagery information and the peripheral imagery information. Thus, negative training is minimized because the blended image looks realistic.

Figure 8:
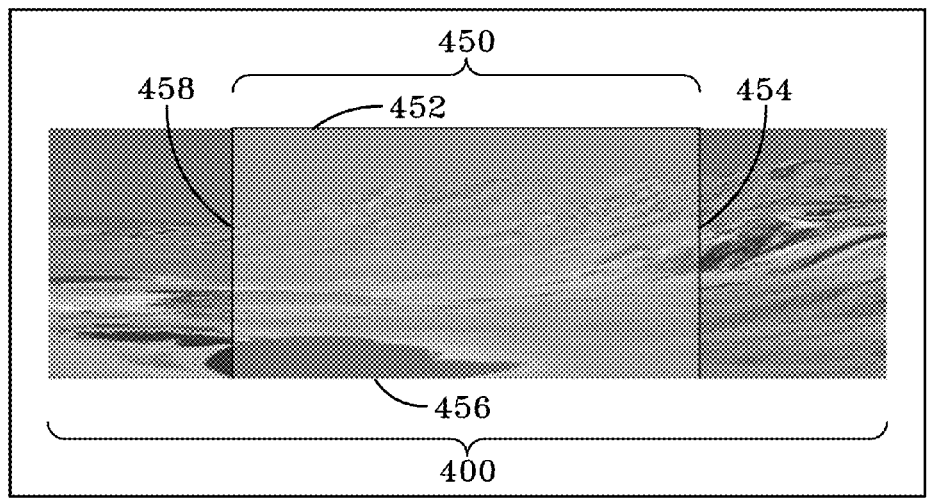
FIG. 8 is a graphical representation of a full field of regard with a field of view highlighted.

As shown in FIG. 8, imagery information generally includes a full field of regard 400 and a field of view 450. In typical embodiments, the field of view 450 is a subset of the full field of regard. In other various embodiments, the field of view 450 and the full field of regard 400 may be equivalent or substantially equivalent.

The full field of regard 400 may include all imagery information at any given time and at any given position in the simulated environment. In other words, the full field of regard may include 360° of visual information that corresponds to any position of the trainee in the simulated environment. The full field of regard 400 may be rendered at least in part in the image generator 300, and may be determined at least in part by one or more sources of information, including but not limited to: image data 304 from the image library 350, instrumentation data 302 from the mock instrumentation apparatus 100, or head tracking information 252 from the head tracking apparatus 250.

As previously discussed, a field of view 450 is typically identified within the full field of regard. Typically, peripheral imagery information is provided via a peripheral display system to the extent that the field of view 450 extends beyond the forward display system 150.

As seen in FIG. 8, the field of view 450 is typically defined by outer edges. For example, these outer edges may include a top edge 452, right edge 454, bottom edge 456, and left edge 458. These outer edges may define a field of view with a circular, rounded, oval, rectangular, square, or any other shape (including irregular shapes). In a particular embodiment, the field of view is modeled after a typical field of view for a human pilot. For example, a typical field of view may range from about 40° H to about 135° H, and from 50° V to about 360° V. In a very particular embodiment the field of view is about 50° H by about 108° V. In various embodiments, the field of view will relate to head tracking information. In various embodiments, the area of the field of view 450 may correspond to the area of the peripheral display system 200, or may be larger or smaller than the area of the peripheral display system 200.

In various embodiments, the peripheral imagery information may be a high resolution image. If the peripheral imagery information includes a high-resolution image, the peripheral display system 200 will typically have a relatively small field of view. Conversely, if the peripheral imagery information includes a relatively low resolution image, the peripheral display system 200 will typically have a relatively large field of view. Thus, in implementing the current concept, one may choose to provide the peripheral imagery information in either high-resolution or low resolution, and this choice may correspond to the size of the field of view. In a very particular embodiment, the peripheral display system 200 is 4000 pixels in the horizontal direction and 2000 pixels in the vertical direction.

Typically, the peripheral imagery information is provided at least in part based on head tracking information 252 generated by a head-tracking apparatus 250. In typical embodiments, the peripheral display system 200 is separate and will not be physically adjoined to the forward display system 150. In other words, although the simulator may merge the forward imagery information on the forward display system 150 with the peripheral imagery information on at least a portion of the peripheral display, in typical embodiments the forward display system 150 and peripheral display system 200 are not physically adjoined to one another.

Figure 9:
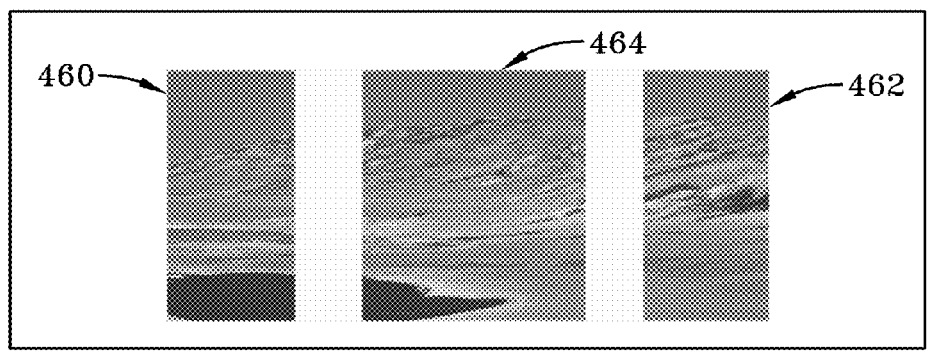
FIG. 9 is a graphical representation of a field of view broken out to show the rendering of three channels.

As FIG. 9 shows, the field of view 450 may be rendered by a plurality of channels that are at least substantially representative of the field of view. In a particular embodiment, the field of view may be rendered by a left channel 460, a right channel 462, and a central channel 464. In a very particular embodiment, the left channel 460 corresponds to the left channel component 322; the right channel 462 corresponds to the right channel component 324; and the central channel 464 corresponds to the primary channel 306.

Figure 10:
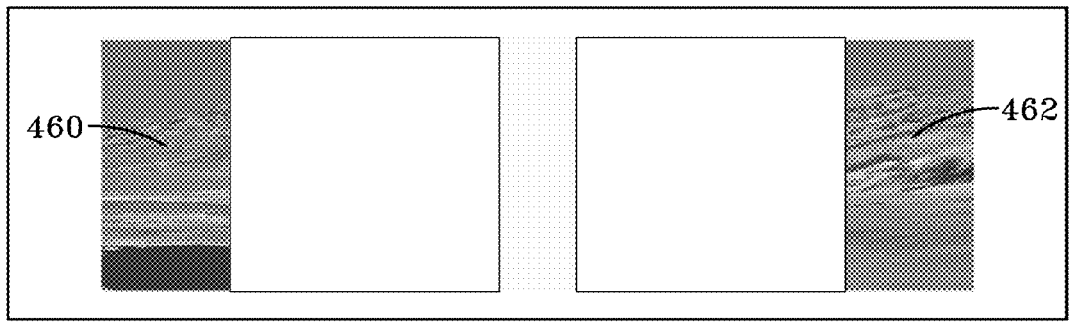
FIG. 10 is a graphical representation of the two peripheral channels to be rendered.

As FIG. 10 shows, the left channel 460 and the right channel 462 may be representative of peripheral imagery information that is altered by one or more masks. In a particular embodiment, the peripheral imagery information is altered by the peripheral mask 318.

Figure 11:
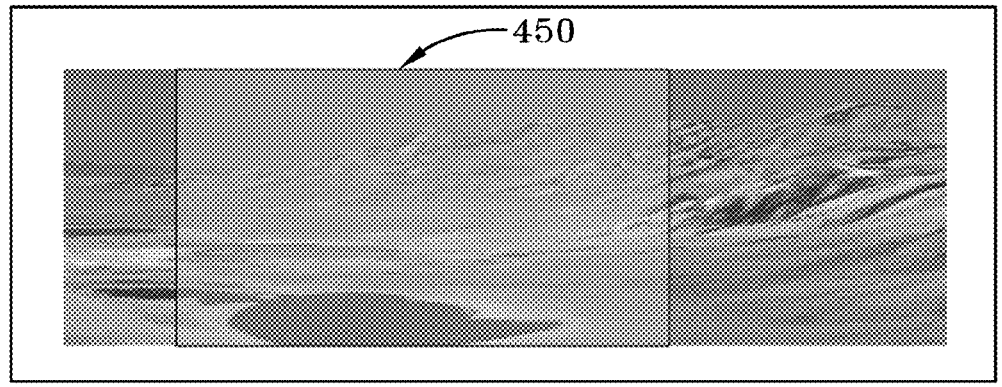
FIG. 11 is a graphical representation of a full field of regard with a field of view highlighted as a trainee moves his or her head left.

As FIG. 11 shows, the field of view 450 may include different imagery information as a trainee's field of view moves to the left. Note that the field of view 450 may also include different imagery information as a trainee moves his or her head in the horizontal and/or vertical directions.

Figure 12:
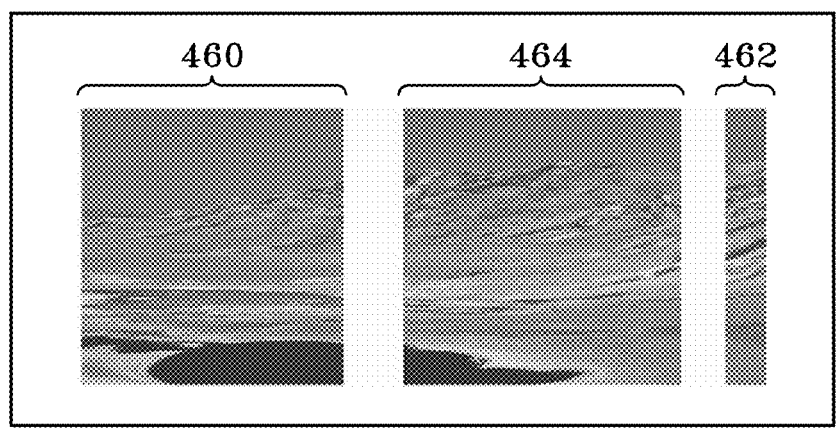
FIG. 12 is a graphical representation of a field of view broken out to show rendering of three channels.

As FIG. 12 shows, as the field of view 450 moves to the right, the left channel 460 may provide a greater area of imagery information (i.e., less imagery information may be filtered out of the left channel). The central channel 464 may still provide the same area of imagery information. The right channel 462 may provide a diminished area of imagery information.

Figure 13:
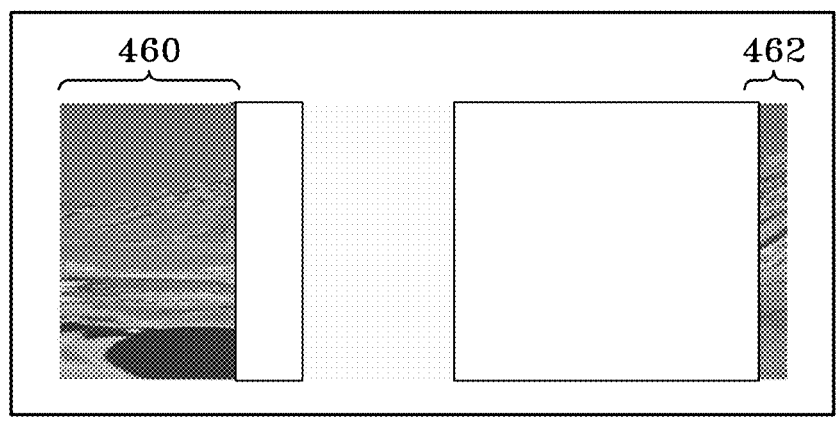
FIG. 13 is a graphical representation of the two peripheral channels to be rendered.

As FIG. 13 shows, the left channel 460 and the right channel 462 may be representative of peripheral imagery information that is altered by one or more masks. In a particular embodiment, the secondary imagery information is altered by the second mask 318.

In sum, the present invention serves to provide trainees with a realistic training experience, by providing a high resolution display while at the same time providing a small footprint and relatively low computing requirements. By merging imagery information of a forward display system and a peripheral display system, the system is capable of providing a small footprint a spherical dome is not required. By eliminating the need for numerous projectors that collectively project a high resolution image over an entire spherical dome, the present system allows relatively low computing requirements.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A method of providing a simulation for a trainee comprising:
   providing a field of view;
   generating and displaying forward imagery information via a forward display system on at least one projection surface that provides out-the-window scenes for the trainee;
   altering said forward imagery information via a forward mask which provides a light intensity of about zero in a forward central region and a light intensity of about one in forward edge regions adjacent said forward central region;
   generating and displaying peripheral imagery information of out-the-window scenes via a peripheral display system on a helmet mounted display surface to the extent that the field of view extends beyond the forward display system;
   altering said peripheral imagery information via a peripheral mask which provides a light intensity of about one at a peripheral central region and a light intensity of about zero at peripheral edge regions adjacent said peripheral central region; and
   blending said forward imagery information in said forward central region and said forward edge regions and said peripheral imagery information in said peripheral central region and said peripheral edge regions to display a final image with normalized light intensity so that all imagery information appears seamlessly displayed to the trainee in said field of view.

2. The method according to claim 1, further comprising:
   generating the peripheral imagery information only to the extent that the field of view extends beyond the forward display system.

3. The method according to claim 1, further comprising:
   generating head tracking information of the trainee with respect to the forward display system; and
   generating the peripheral imagery information based in part on the head tracking information.

4. The method according to claim 3, further comprising:
   displaying the forward imagery information substantially independent of the head tracking information.

5. The method of providing a simulation according to claim 1, further comprising:
   identifying the field of view within a field of regard;
   rendering a plurality of channels that are at least substantially representative of the field of view;
   relating the forward imagery information to one of the plurality of channels; and
   relating the peripheral imagery information to at least a second of the plurality of channels.

6. The method according to claim 5, further comprising:
   generating the forward imagery information with at least one high-resolution projector for display on the at least one projection surface.

7. The method according to claim 5, further comprising:
   providing the head-mounted assembly with a helmet shell that carries a visor; and
   projecting the peripheral imagery information with at least one graphics generator onto respective left and right sides of the visor, wherein the visor has a centrally disposed section that remains visually transparent to allow the trainee to view the forward imagery projected on the at least one projection surface.

8. A simulator for a trainee comprising:
   an image generator for generating forward and peripheral out-the-window imagery information;

a forward display for displaying forward imagery information on a projection surface;

a peripheral display for displaying peripheral imagery information on a helmet mounted display surface, wherein the forward display and the peripheral display are physically separate and the image generator generates the forward and peripheral imagery information so that the generated out-the-window imagery appears blended to the trainee;

a forward mask maintained by said image generator to alter said forward imagery information so as to provide a light intensity of about zero in a forward central region and a light intensity of about one in forward edge regions adjacent said forward central region; and a peripheral mask maintained by said image generator to alter said peripheral imagery information so as to provide a light intensity of about one at a peripheral central region and a light intensity of about zero at peripheral edge regions adjacent said peripheral central region;

wherein said image generator effectively blends said forward central region, said forward edge regions, said peripheral central region and said peripheral central region and said peripheral edge regions to display a final image with normalized light intensity so that all imagery information appears seamlessly displayed to the trainee in said field of view.

9. The simulator of claim 8 wherein the forward imagery information and the peripheral imagery information are displayed on their respective surfaces such that the forward imagery information and the peripheral imagery information are capable of being merged.

10. The simulator of claim 8 further comprising:
a helmet which carries the helmet mounted display surface; and
a head-tracking apparatus carried by the helmet that generates head tracking information, wherein the head tracking information relates to at least one of: a head orientation, a head position, an eye orientation, an eye position, or a line of sight.

11. The simulator of claim 10 wherein:
the peripheral imagery information is displayed on the helmet mounted display surface, and wherein the visor has a centrally disposed section that remains visually transparent to allow the trainee to view the forward imagery projected on the projection surface and the peripheral imagery projected on the helmet mounted display surface which is displayed at least in part based on the head tracking information.

12. The simulator of claim 11 wherein:
the forward imagery information is displayed substantially independent of the head tracking information.

13. The simulator of claim 11 wherein:
the image generator affects at least a primary channel and a supplemental channel;
wherein the primary channel corresponds to the forward imagery information; and
wherein the supplemental channel corresponds to the peripheral imagery information.

14. The simulator of claim 13 wherein the supplemental channel comprises:
a left component corresponding to a left eye; and
a right component corresponding to a right eye.

* * * * *